Jan. 22, 1963 L. J. O'DELL ETAL 3,074,218
GAS CLEANER
Filed Feb. 16, 1961
2 Sheets-Sheet 2

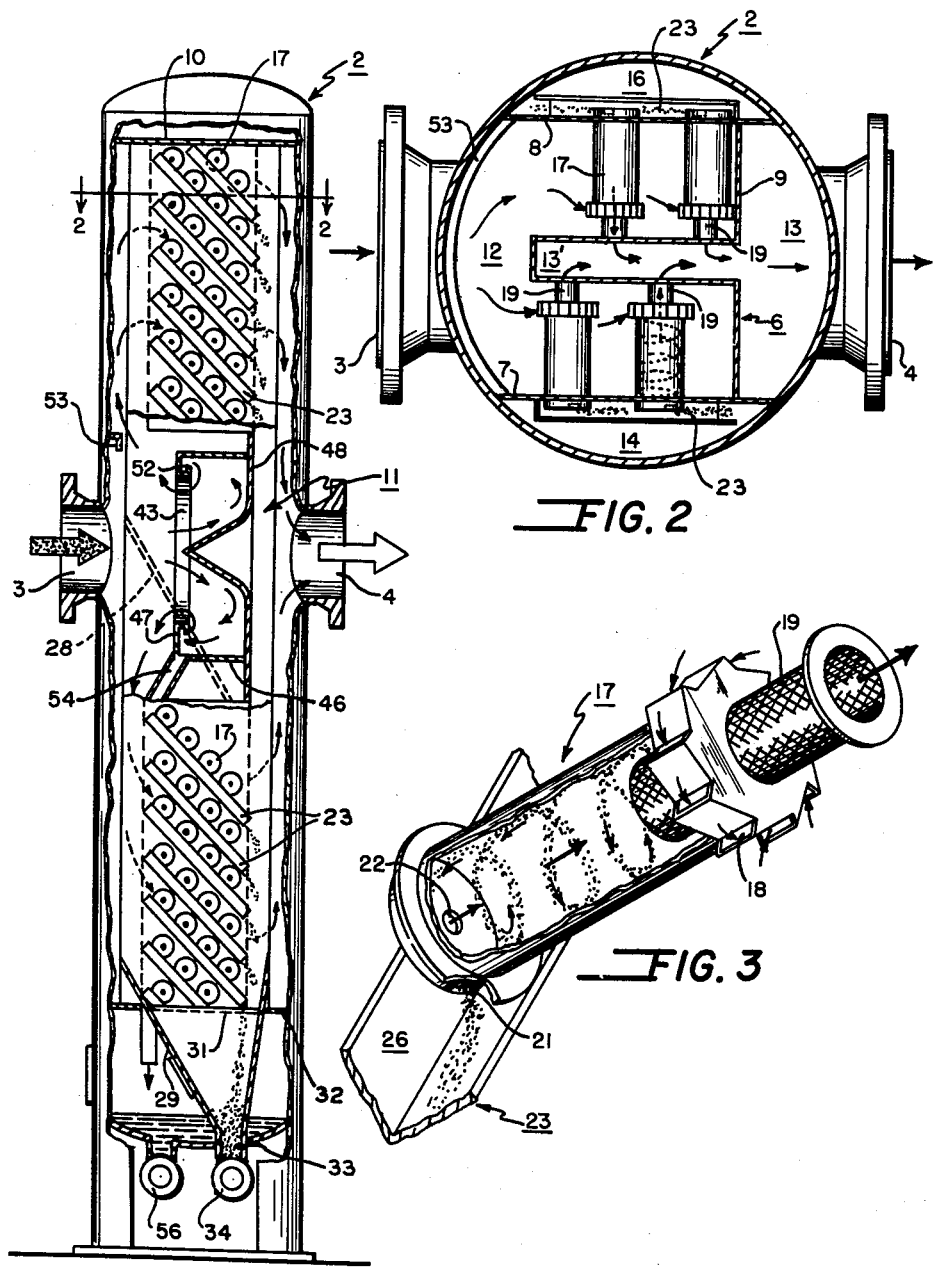

INVENTORS
LEONARD J. O'DELL
KARL L. WESTLIN
BY
Ralph C. Brick
ATTORNEY

United States Patent Office 3,074,218
Patented Jan. 22, 1963

3,074,218
GAS CLEANER
Leonard J. O'Dell and Karl L. Westlin, Louisville, Ky., assignors to American Air Filter Company, Inc., Louisville, Ky., a corporation of Delaware
Filed Feb. 16, 1961, Ser. No. 89,832
6 Claims. (Cl. 55—343)

The present invention relates to gas cleaning apparatus and more particularly to an improved arrangement in gas cleaning apparatus of the type which utilizes a plurality of tubular centrifugal separators to remove contaminants from a dirty gas stream.

Various centrifuging devices are known in the art of gas cleaning which are constructed to meet particular operating conditions. As is most often the case, these devices are substantially limited in their operating range so that they might operate efficiently for the particular conditions for which they were constructed. For example, some gas cleaners, which are capable of removing contemplated particles of contaminant from a gas stream, break down when the stream to be treated becomes loaded with foreign matter such as dirty liquids not contemplated for the particular cleaner. Others only can treat gases efficiently when the gases are conveyed under a preselected, narrow pressure range—bulky, expensive equipment being required when gas pressures become excessive.

The present invention overcomes the aforementioned difficulties of past apparatus to provide an improved gas cleaning apparatus which is efficient in construction and operation, which is capable of handling large volumes of gas over a wide operating pressure range with a minimum of space and materials, and which is capable of efficiently removing contaminants of varying size. Although the apparatus of the present invention is particularly useful in cleaning natural gases conveyed in overland pipe lines at high pressures (for example, 700 p.s.i.–1000 p.s.i.), which natural gases have varying contaminants ranging from water and liquid hydrocarbons to sand, dust and rust, it is to be understood that the apparatus of the present invention can be economically employed in other environments less demanding.

Various other features of the present invention will become obvious to one skilled in the art upon reading the disclosure set forth hereinafter.

More particularly, the present invention provides a gas cleaning apparatus which incorporates in a single housing having spaced gas inlet and gas outlet means, a plurality of horizontally extending closely spaced tubular centrifugal dust separators, each separator having a dirty gas inlet opening communicating through a dirty gas chamber with the dirty gas inlet of the housing, a clean gas outlet opening communicating through a clean gas chamber with the clean gas outlet of the housing, and a dust discharge opening communicating with a dust chamber arrangement in the housing to accommodate dust discharge from the separator, the single housing further including intermediate the dirty gas inlet of the housing and the dirty gas inlets of the separators, liquid separator means baffled to centrifuge liquids from the gases before they are directed to the centrifugal separators, the liquid separator means having an enclosed drain trough means to drain off separated dirty liquids and sludge. Further, the present invention provides a unique chamber partitioning arrangement for positioning in a pressure resistant housing of cylindrical nature with minimum girth requirements, a maximum of efficiently operating horizontal dust centrifuging tubes to thus permit high pressure operations at a minimum of cost.

It is to be understood that various changes can be made by one skilled in the art in the arrangement, form and construction of the apparatus herein disclosed without departing from the scope or spirit of the present invention.

Referring to the drawings which disclose an advantageous embodiment of the present invention:

FIGURE 1 is a partially broken away, vertical elevational view of a cylindrical high pressure housing with gas cleaning apparatus of the present invention disposed therein;

FIGURE 2 is an enlarged, cross-sectional, partially schematic view of the apparatus of FIGURE 1 taken in a plane passing through line 2—2 of FIGURE 1;

FIGURE 3 is an even further enlarged isometric view of one of the tubular centrifugal dust separators of FIGURES 1 and 2;

Figures 4, 5:
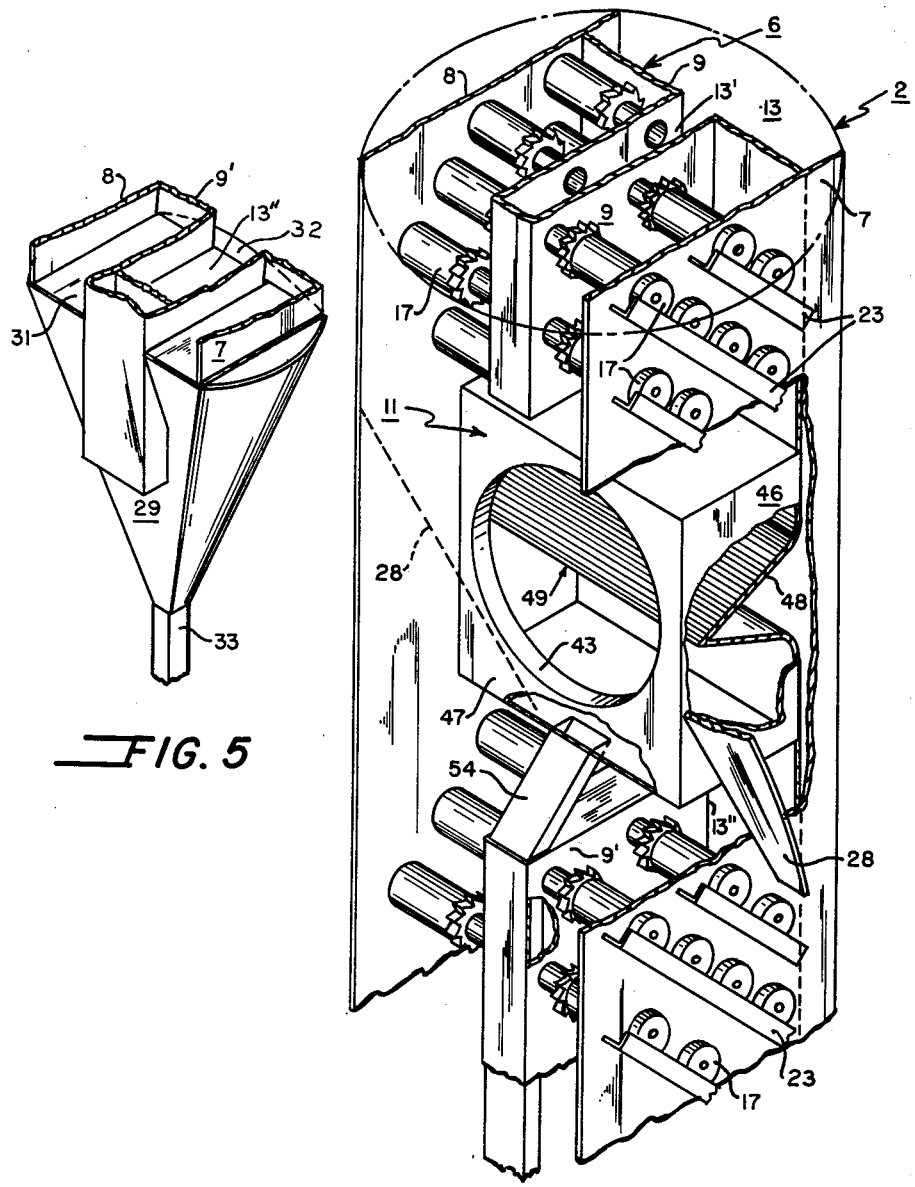
FIGURE 4 is an enlarged isometric partial view of the dust cleaning apparatus of FIGURES 1 and 3; and, FIGURE 5 is an isometric view of hopper apparatus which cooperates with the dust cleaning apparatus of FIGURE 4, this figure being slightly reduced in comparison with FIGURE 4.

Referring to FIGURE 1 of the drawings, a vertically extending housing 2 is disclosed in the form of a cylindrical pressure vessel. Housing 2 has positioned intermediate its extremities a spaced dirty gas inlet 3 and a clean gas outlet 4. When the apparatus of the present invention is to be used in high pressure operations, for example, as a gas cleaner in a natural gas pipe line, housing 2 can be made from a suitably selected steel plate capable of withstanding pressures exceeding 1000 p.s.i.

As can be seen more fully in FIGURE 2 of the drawings, housing 2 is divided into four principal chambers by means of a vertically extending partition member indicated broadly by reference numeral 6. Partition 6, which can be made from one or several welded-together, gas impervious flat sheets of suitable material, such as steel, includes spaced, vertically extending side walls 7 and 8. The vertical edges of walls 7, 8 are fastened in sealed relationship against the inner face of the cylindrical wall of housing 2 by some suitable means such as welding. Extending between vertically extending side walls 7 and 8 so that the vertical edges thereof are in sealed relationship against the face of the side walls, are upper and lower spaced, channel forming, vertically extending intermediate walls 9 and 9', respectively, these intermediate walls 9, 9' being vertically spaced from each other to form a void adjacent gas inlet 3 of housing 2. In this connection, it is to be noted that the upper edges of side walls 7, 8 and the upper intermediate wall 9 can be arranged to fall in the same horizontal plane so that a suitable horizontal seal plate 10 can readily be fastened thereto for reasons as set forth hereinafter. In like manner, the lower edges of side walls 7 and 8 and the lower edge of lower intermediate wall 9' also can be arranged to fall in the same horizontal plane.

Partition 6 which is formed of side walls 7, 8 and channel-shaped intermediate walls 9 and 9' as abovedescribed, is of substantially M-shaped cross-section along its entire length except for the void portion adjacent gas inlet 3 formed by the spaced upper and lower channel-shaped intermediate walls 9 and 9'. This void portion serves to accommodate a liquid separator 11, which is positioned in the housing 2 downstream and opposite gas inlet 3. As was abovementioned, partition 6 (FIGURE 2) serves to divide housing 2 into four principal chambers; namely, dirty gas inlet chamber 12 which communicates with dirty gas inlet 3 of housing 2, clean gas outlet chamber 13 which communicates with clean gas outlet 4 of housing 2 and which includes upper and lower clean gas channel portions 13' and 13'', respectively, and spaced dust chamber 14 and 16. Although not shown in detail, it is to be understood that suitable seal plates can be provided where necessary to seal dirty gas inlet chamber 12 from the clean gas chamber 13 and dust chambers 14, 16 from chambers 12 and 13.

Mounted in dirty gas inlet chamber 12 above and below the aforedescribed void portion of the chamber are upper and lower sets of horizontally disposed, longitudinally extending tubular centrifugal dust separators 17 (FIGURE 3). Although its is to be understood that the present invention is not to be considered as limited to the particular dust separator construction disclosed, it has been found advantageous to use a separator similar to that set forth in U.S. Patent No. 2,762,450, issued to K. L. Westlin on September 11, 1956. As such, each separator 17 includes a tangential gas inlet 18, an axial clean gas outlet 19, and, a dust flow end, containing a peripheral dust discharge orifice 21 and an axial gas recirculating orifice 22. It is to be noted that the upper and lower sets of dust separators 17 are each divided into pairs of spaced parallel banks of spaced inclined rows of separators, the separators of corresponding banks of the upper and lower pair on one side of the housing extending horizontally in dirty gas inlet chamber 12 between side wall 7 and one side of channel portions 13′, 13″ formed by upper and lower channel-shaped intermediate walls 9 and 9′ and the separators of corresponding banks of upper and lower pairs on the other side of the housing extending between side wall 8 and the other side of the channel portions 13′, 13″. In this connection, it also is to be noted that the separators 17 are so positioned that tangential gas inlets 18 of all the separators of both the upper and lower separator sets communicate with dirty gas inlet chamber 12, that the axial clean-gas outlets 19 of all separators of the upper set communicate with upper clean gas channel portion 13′ and that the axial clean gas outlets 19 of all of the separators of the lower set communicate with lower clean gas channel portion 13″. It further is to be noted that in the disclosed arrangement, the upper and lower clean gas channels 13′ and 13″ of clean gas chamber 13, each serve both banks of a bank pair. In this connection, it also is to be noted that the separators 17 are so positioned that the peripheral discharge orifices 21 and the gas recirculating orifices 22 of the separators in upper and lower corresponding banks on one side of housing 2 communicate with one of the two dust chambers 14, 16 and the discharge orifices 21 and gas recirculating orifices 22 of separators in upper and lower corresponding banks on the other side of housing 2 communicate with the other of the two dust chambers 14, 16. As in U.S. Patent No. 2,762,450, a series of vertically spaced downwardly inclined chutes 23 are mounted in each of dust chambers 14, 16 in position to provide a downwardly inclined chute passage for each corresponding inclined row of dust separators 17. As in the aforementioned patent, each chute 23 is secured to one of the side walls 7, 8 of partition 6 and further is provided with an upwardly extending flange 26 which is spaced from the inner face of the cylindrical wall of housing 2.

Referring to FIGURES 1 and 4 of the drawings, it can be seen that each of vertically extending dust chambers 14, 16 is provided with an inclined dust baffle 28 which is positioned intermediate the dust chamber ends between the upper and lower bank of separators. These baffles serve to channel dust from the lower inclined chutes of the upper bank of separators and any other loose dust from such upper bank to the sides of the dust chamber so that such dust does not interfere with the dust discharge operations of the separators in the lower bank—particularly the operations of the separators in the upper portion of the lower bank.

As can be seen in FIGURE 1 of the drawings, and more fully in FIGURE 5, a hopper 29 is provided in the lower portion of housing 2, hopper 29 being communicably connected at either side to dust chambers 14, 16. It is to be noted that a suitable seal plate 31 is provided at the upper portion of hopper 29 to seal off the hopper from the dirty gas chamber 12. This seal plate also seals off hopper 29 from lower clean gas channel portion 13″, the seal plate further having an arcuate portion 32 extending in sealed relationship against the inner face of the cylindrical wall of housing 2 to seal off the lower portion of clean gas chamber 13 from the lower portion of housing 2. In this connection and as abovementioned, it is to be understood that other suitable seal plates (not shown) can be provided at the upper extremities of the respective chambers and at the lower extremity of clean gas channel portion 13′ to seal off the chamber 13. Hopper 29 includes a downwardly extending dust chute 33 integral therewith which chute passes through the bottom of housing 2. Suitable automatic valve devices (not shown) may cooperate with outlet 34 of chute 33 to empty the hopper as required.

As abovementioned and referring to FIGURES 1 and 4 of the drawings, liquid separator 11 is positioned in the void of dirty gas chamber 12 formed between channel portions 13′ and 13″ of the clean gas chamber 13. In the advantageous embodiment disclosed, separator 11 is in the form of a rectangular housing including four side walls 46, a front wall 47 and a rear wall 48. Front wall 47 is provided with a gas inlet 43 spaced opposite to and communicating with dirty gas inlet 3 of housing 2. Rear wall 48 is in the form of a baffle which diverges from an upstream horizontally extending crest 49 outwardly in a sloping acute angle to join with the side walls of the housing. Advantageously, the angle of divergence of the baffle-like rear wall can range from 30° to 120°, the angle being sufficient to insure that any liquid in the gas stream that is treated will remain on the surface of the baffle when it impinges against such baffle rather than be deflected therefrom. It is to be noted that the periphery of gas inlet 43 is surrounded by a liquid trap 52 of right angle cross-section. In addition, an arc-like liquid trap 53 also of right angle cross-section is mounted on the inner face of the cylindrical wall of housing 2 above gas inlet 3. Finally, it is to be noted that an enclosed, downwardly extending liquid drain chute 54 is provided at the lower side wall 46 of the housing of separator 11. This drain chute, which advantageously extends through the channel portion 13″ of the clean gas chamber 13, communicates with the lower portion of housing 2 at a point below the lower set of dust separators 17, the lower portion of housing 2 being provided with a suitable liquid outlet 56 to permit controlled discharge of liquid from the housing, suitable automatic devices (not shown) being associated with the outlet 56 to provide such control.

In a typical operation of the apparatus described, a stream of dirty gas at high pressure (for example, 700 p.s.i. to 1000 p.s.i.) enters through gas inlet 3 and passes through the spaced opposed gas inlet 43 of liquid separator housing 11. The stream is split into an upper and lower stream and centrifuged by the diverging baffle-shaped rear wall 48 of separator 11, with the liquid in the gas impinging against and remaining on the surface of the baffle. The direction of the upper and lower centrifuged gas streams is reversed at the extremities of the rear wall 48, and such upper and lower gas streams pass out of the housing adjacent the peripheral portions of the inlet 43 of separator 11, in counterflow to the undivided stream of dirty incoming gases. It is to be noted that the counterflow of gases enhances the cleaning action and that a good portion of the liquid divided into two streams and centrifuged by rear baffle wall 48 are trapped by liquid trap 52 surrounding outlet 43. The entrapped liquid flows by gravity to the lower portion of separator 11 through drain chute 54, to be discharged into the lower portion of housing 2 where it can be removed manually or by automatic means through outlet 56. Additional liquid remaining in the upper and lower gas streams impinges against the housing, the arc-like liquid trap 53 above gas inlet 3 preventing such liquid from travelling along with the upper stream to direct it toward the bottom of the housing along with the liquid from the lower stream. It is to be further noted that the liquid centrifuged from the gases along the walls of separator 11 and housing 2 serves as a further scrubbing means for some of the particles of dirt in the upper and lower gas streams. The upper and lower dust laden gas streams pass into the upper and lower portions of gas chamber 12, respectively, to enter into the tangential gas inlets 18 of separator 17 arranged in upper and lower sets. The dust laden gas is centrifuged in the separators, with the clean gas from the banks of tubes passing into clean gas channels 13' and 13" of clean gas chamber 13 and out through clean gas outlet 4. The dust from the separators 17 is discharged from dust discharge orifices 21 of the separators onto inclined chutes 23 in dust chambers 14, 16, the dust being carried to the side of the chamber by inclined chutes 23 and any loose dust from the banks of the upper set being appropriately diverted to the sides of the chamber above the bank of the lower set by intermediate baffles 28. As in U.S. Patent No. 2,762,450, a portion of the dust laden gas is swept along with the dust through discharge orifices 21 and is returned as clean gas to separators 17 through gas recirculating orifices 22. The dust passes from chambers 14, 16 to hopper 29 where it can be removed by manual or automatic means through outlet 34.

The invention claimed is:

1. A gas cleaner apparatus comprising: a housing having dirty gas inlet means intermediate the extremities thereof and clean gas outlet means spaced from said gas inlet means, a first set of spaced parallel horizontally extending tubular centrifugal dust separators disposed in said housing in inclined rows adjacent one side of said dirty gas inlet means, a second set of spaced parallel horizontally extending tubular centrifugal dust separators disposed in said housing in inclined rows in spaced relation from said first set of separators adjacent the other side of said dirty gas inlet means, each of said separators of each set of separators having a dirty gas inlet opening, a clean gas outlet opening and a dust discharge opening, dirty gas chamber means in said housing communicably connecting said dirty gas inlet openings of said separators of each set with the dirty gas inlet means of said housing, liquid separator means disposed in said dirty gas chamber means intermediate said first and second sets of separators, said liquid separator means including diverging baffle means against which an incoming gas stream to be treated impinges to be divided and reversed in counterflow to the incoming portion of said stream into separate streams for each of the separator sets and enclosed drain trough means cooperatively positioned relative said baffle means to drain off liquids and sludge, said enclosed drain trough means extending to the lower portion of said housing, dust chamber means in said housing having spaced inclined rows of chutes disposed therein, each chute being communicably connected to the dust discharge openings of an inclined row of said separators of said sets of dust separators to direct dust discharge from said separators along the side of said dust chamber means, and clean gas chamber means in said housing to communicably connect said clean gas outlet openings of said separators of said sets of separators with the clean gas outlet means of said housing.

2. The apparatus of claim 1, said dust chamber means including baffle means in said dust chamber means intermediate said first and second sets of dust separators to divert dust from the dust discharge openings of one set of separators away from the dust discharge openings of the other set.

3. A gas cleaner apparatus comprising: a housing having dirty gas inlet means intermediate the extremities thereof and clean gas outlet means spaced from said gas inlet means, a first set of spaced banks of parallel horizontally extending tubular centrifugal dust separators disposed in said housing adjacent one side of said dirty gas inlet means, a second set of spaced banks of parallel horizontally extending tubular centrifugal dust separators disposed in said housing in spaced relation from said first set of separators adjacent the other side of said dirty gas inlet means, each of said separators of each set of separators having a dirty gas inlet opening, a clean gas outlet opening and a dust discharge opening, dirty gas chamber means in said housing communicably connecting said dirty gas inlet openings of said separators of each set with the dirty gas inlet means of said housing, liquid separator means disposed in said dirty gas chamber means intermediate said first and second set of banks of separators said liquid separator means including diverging baffle means against which an incoming gas stream to be treated impinges to be divided and reversed in counterflow to the incoming portion of said stream into separate streams for each of the separator sets and an enclosed drain trough means cooperatively positioned relative said baffle means to drain off dirty liquids and sludge separated from the dirty gas to be treated by said baffle means, dust chamber means in said housing communicably connected to said dust discharge openings of said separators of said sets of separators to accommodate dust discharged from said separators, and clean gas chamber means in said housing, said clean gas chamber means including a channel portion interposed between said clean gas outlet openings of said spaced separator banks of said sets of separators to communicably connect said outlet openings of said separators with the clean gas outlet means of said housing.

4. A gas cleaner apparatus comprising: a vertically extending cylindrical high pressure housing having a dirty gas inlet intermediate the extremities thereof and a clean gas outlet spaced from such gas outlet, a vertically extending partition of substantially M-shaped horizontal cross-section disposed within said housing to divide said housing into a dirty gas chamber communicating with said dirty gas inlet of said housing, a clean gas chamber including a pair of spaced channel portions, said clean gas chamber communicating with said clean gas outlet, and a pair of dust chambers, a first pair of horizontally spaced banks of parallel horizontally extending tubular centrifugal dust separators disposed in said housing above said dirty gas inlet, a second pair of horizontally spaced banks of parallel horizontally extending tubular centrifugal dust separators disposed in said housing in spaced relation from said first pair of separator banks below said dirty gas inlet, each of said separators in each bank of separators having a dirty gas inlet opening, a clean gas outlet opening and a dust discharge opening, said dirty gas inlet opening of all of said separators communicating with said dirty gas chamber, said clean gas outlet openings of said separators of each bank communicating with one of the pair of channel portions of said clean gas chamber, and said dust discharge openings of said separators each communicating with one of the pair of said dust chambers, and liquid separating means disposed in said dirty gas chamber between said upper and lower pairs of separator banks, said liquid separator means having a gas inlet opposed to said dirty gas inlet of said housing and including diverging baffle means against which a gas stream to be treated impinges to be divided into separate streams for the upper and lower pairs of separator banks and further including an enclosed drain trough means to drain off dirty liquid and sludge separated from the dirty gas to be treated by said baffle means.

5. A gas cleaner apparatus comprising: a housing having spaced dirty gas inlet and clean gas outlet means, at least one set of spaced parallel banks of horizontally extending tubular centrifugal dust separators disposed in said housing, each of said separators of each bank having a dirty gas inlet opening, a clean gas outlet opening and a dust discharge opening, dirty gas chamber means in said housing communicably connecting said dirty gas inlet openings of said separators of each bank with the dirty gas inlet means of said housing, liquid separator means disposed in said dirty gas chamber means intermediate said dirty gas inlet means of said housing and said dirty gas inlet openings of said separators, said liquid separator means including baffle means against which an incoming gas stream to be treated impinges to be divided into separate stream portions reversed in counterflow to the incoming portion of said stream to centrifuge the liquids from treated gases before such stream portions are directed to the separators and including an enclosed drain trough means communicably connected to said liquid separator means to drain off separated dirty liquids and sludge, dust chamber means in said housing communicably connected to the dust discharge openings of said separators of each bank to accommodate dust discharged from said separators, and clean gas chamber means in said housing to communicably connect said clean gas outlet openings of said separators of each bank with the clean gas outlet means of said housing.

6. A gas cleaner apparatus comprising: a housing having dirty gas inlet means and clean gas outlet means spaced from said gas inlet means, a first set of spaced parallel tubular centrifugal dust separators disposed in said housing adjacent one side of said dirty gas inlet means, a second set of spaced parallel tubular centrifugal dust separators disposed in said housing in spaced relation from said first set of separators adjacent the other side of said dirty gas inlet means, each of said separators of each set of separators having a dirty gas inlet opening, a clean gas outlet opening and a dust discharge opening, dirty gas chamber means in said housing communicably connecting said dirty gas inlet openings of said separators of each set with the dirty gas inlet means of said housing, a liquid separator receptacle disposed in said dirty gas chamber means intermediate said first and second sets of separators to centrifuge liquid and sludge from an incoming gas stream, said separator receptacle including a diverging baffle member against which an incoming gas stream impinges to be divided into separate stream portions for each of said sets of separators which stream portions are reversed to be in counterflow to the incoming portion of said dirty gas stream, said liquid separator receptacle further including liquid trap means downstream of said diverging baffle member to trap centrifuged sludge and liquid from said counterflowing gas stream portions, enclosed drain trough means communicably connected to said receptacle to drain off the dirty liquid and sludge separated thereby, dust chamber means in said housing communicably connected to said dust discharge openings of said separators of said sets of dust separators to accommodate dust discharged from said separators, and clean gas chamber means in said housing to communicably connect said clean gas outlet openings of said sets of separators with the clean gas outlet means of said housing.

References Cited in the file of this patent

UNITED STATES PATENTS

| 1,277,691 | Brantingham et al. | Sept. 3, 1918 |
| 2,158,863 | Randall | May 16, 1939 |
| 2,331,720 | Osgood | Oct. 12, 1943 |
| 2,551,890 | Love | May 8, 1951 |
| 2,632,527 | McBride et al. | Mar. 24, 1953 |
| 2,762,450 | Westlin | Sept. 11, 1956 |

FOREIGN PATENTS

| 494,554 | Canada | July 21, 1953 |